(12) United States Patent
Williams et al.

(10) Patent No.: US 9,475,244 B2
(45) Date of Patent: *Oct. 25, 2016

(54) METHOD FOR FABRICATION OF A NON-PNEUMATIC SURVIVABLE TIRE AND WHEEL ASSEMBLY

(71) Applicant: The Boeing Company, Chicago, IL (US)

(72) Inventors: Timothy L. Williams, Seattle, WA (US); Eldon C. Rogers, Auburn, WA (US)

(73) Assignee: The Boeing Company, Chicago, IL (US)

( * ) Notice: Subject to any disclaimer, the term of this patent is extended or adjusted under 35 U.S.C. 154(b) by 475 days.

This patent is subject to a terminal disclaimer.

(21) Appl. No.: 14/035,630

(22) Filed: Sep. 24, 2013

(65) Prior Publication Data
US 2014/0020817 A1    Jan. 23, 2014

Related U.S. Application Data

(62) Division of application No. 12/855,628, filed on Aug. 12, 2010, now Pat. No. 8,567,461.

(51) Int. Cl.
*B29D 30/00* (2006.01)
*B60C 7/18* (2006.01)
*B29D 30/02* (2006.01)

(52) U.S. Cl.
CPC .......... *B29D 30/0061* (2013.01); *B29D 30/02* (2013.01); *B60C 7/18* (2013.01); *B60C 2007/107* (2013.04); *Y10T 29/49494* (2015.01); *Y10T 29/49538* (2015.01); *Y10T 152/10297* (2015.01)

(58) Field of Classification Search
CPC ... B29D 30/02; B60C 7/18; B60C 2007/107; Y10T 152/10; Y10T 152/10297; Y10T 29/49538; Y10T 29/4954; Y10T 29/49494; Y10T 29/49952; Y10T 29/49957; Y10T 29/49297
See application file for complete search history.

(56) References Cited

U.S. PATENT DOCUMENTS

| | | | | |
|---|---|---|---|---|
| 811,232 A * | 1/1906 | Lang | .......................... | B60C 7/12 152/328 |
| 1,343,684 A * | 6/1920 | Runyan | .................... | B60C 7/125 101/376 |
| 4,033,395 A * | 7/1977 | Berg | ....................... | B29D 30/02 152/310 |
| 5,042,544 A * | 8/1991 | Dehasse | .................... | B60C 7/12 152/302 |
| 7,418,988 B2 * | 9/2008 | Cron | ......................... | B60C 7/18 152/11 |
| 2006/0118223 A1 * | 6/2006 | Maeda | .................... | B29D 30/02 152/323 |
| 2007/0267116 A1 * | 11/2007 | Rhyne | ........................ | B60C 7/18 152/246 |
| 2009/0107596 A1 * | 4/2009 | Palinkas | ................. | B29D 30/02 152/209.1 |
| 2009/0211674 A1 * | 8/2009 | Hanada | ..................... | B60C 7/12 152/53 |
| 2009/0283185 A1 * | 11/2009 | Manesh | .................... | B60B 9/00 152/11 |

* cited by examiner

*Primary Examiner* — Sarang Afzali
(74) *Attorney, Agent, or Firm* — Felix L. Fischer

(57) ABSTRACT

A method for fabrication of a non-pneumatic tire and wheel assembly incorporates a tire tread and a conventional vehicle wheel with an elastomer tire body element formed by introducing elastomer into mold elements with a center plug and releasably carried chamber forms to provide integral wall elements extending radially inward from the tire body element for sealing engagement with the wheel. The tire body element includes multiple concentric layers with alternating spokes formed with strut and aperture dimensions in the mold elements and mating rubber cast blocks adapted for the desired spoke design. After curing, the tire assembly is mounted on the conventional wheel with conventional mounting tools to deform the integral side walls and a pneumatic chamber formed by the side walls is inflated.

18 Claims, 4 Drawing Sheets

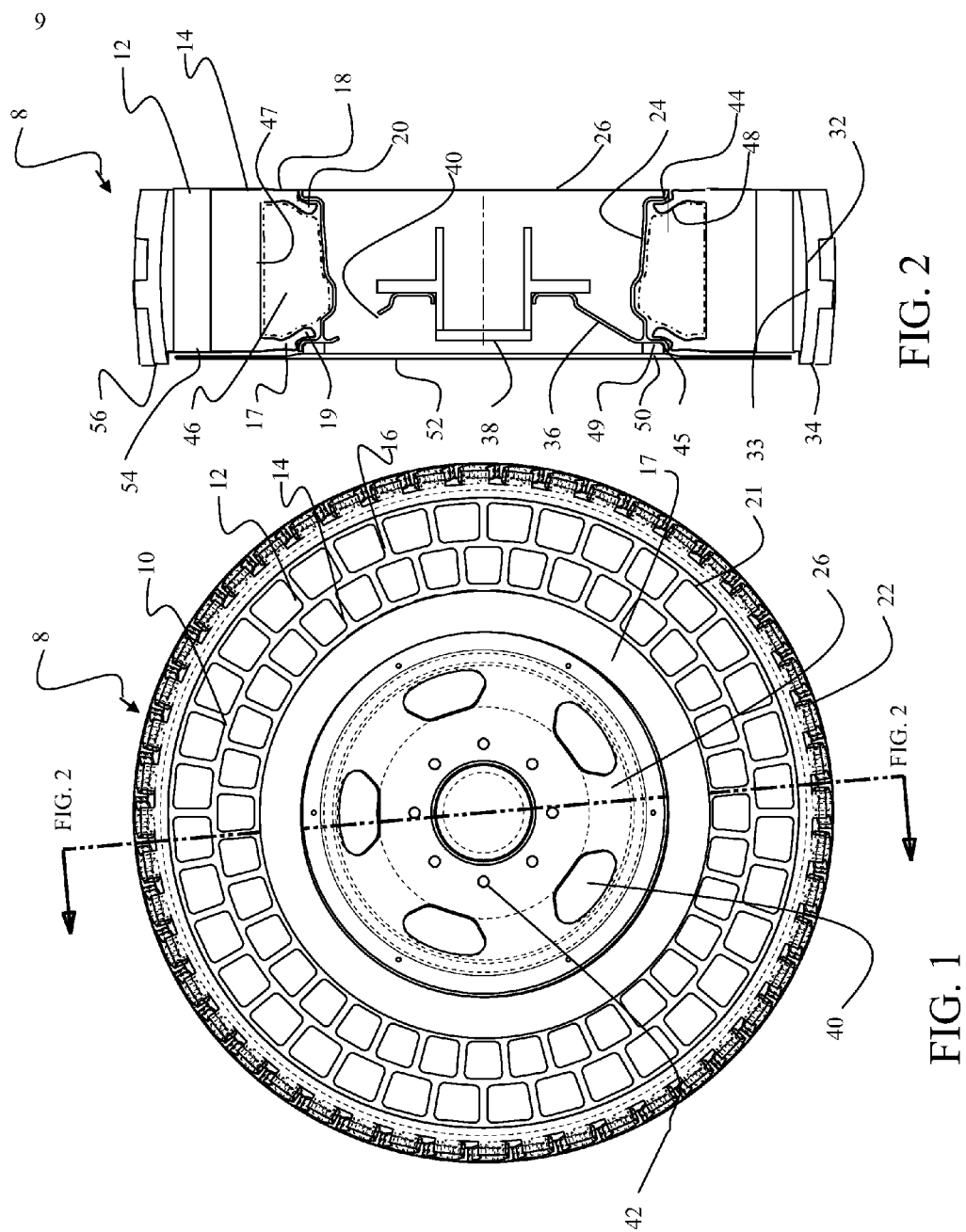

METHOD FOR FABRICATION OF A NON-PNEUMATIC SURVIVABLE TIRE AND WHEEL ASSEMBLY

REFERENCE TO RELATED APPLICATIONS

This application is a divisional application of U.S. patent application Ser. No. 12/855,628 filed on Aug. 12, 2010 now issued as U.S. Pat. No. 8,567,461 entitled NON-PNEUMATIC SURVIVABLE TIRE MOUNTING SYSTEM FOR CONVENTIONAL WHEELS and is with U.S. patent application Ser. No. 12/855,622 filed on Aug. 12, 2010 now issued as U.S. Pat. No. 8,555,941 entitled NON-PNEUMATIC SURVIVABLE TIRE, COVER AND FABRICATION PROCESSES and application Ser. No. 14/028,129 filed on Sep. 16, 2013 entitled NON-PNEUMATIC SURVIVABLE TIRE, COVER AND FABRICATION PROCESSES, all having a common assignee with the present application, the disclosures of which are incorporated herein by reference as though fully set forth.

BACKGROUND INFORMATION

1. Field

Embodiments of the disclosure relate generally to the field of non-pneumatic tires and more particularly to embodiments for a survivable non-pneumatic tire having molded construction with a flexible spoke structure for tactical wheeled vehicle application with an integral pneumatic interface for mounting to conventional wheels

2. Background

Tactical military vehicles are subject to extreme environments and the potential for combat damage. Existing pneumatic tires in use on many vehicles may be vulnerable to blast and fragmentation effects from improvised explosive devices (IED) and other explosive or penetrating threats which render military vehicles inoperable and can leave their crew stranded in harms way. Additionally, flexing of tire walls in pneumatic tires may create heating that may increase detectable thermal emissions. Armor shielding provides protection from small arms fire and fragments, but greatly increases vehicle weight, reduces payload, reduces mobility and maneuverability, and reduces vehicle range. Existing wheel/tire covers are mounted outboard of the pneumatic tire due to the tire wall bulge where they are vulnerable to terrain obstacles and may be damaged or destroyed in the course of rugged terrain operations.

Non-pneumatic tires have been introduced for improved durability and puncture resistance on vehicles for many applications including tactical military vehicles for the ability to withstand blast effects and projectile punctures that could disable a vehicle with pneumatic tires. Solid rubber tires provide desired puncture resistance but may be heavy and have excessive rotating inertia for many desired applications. Wheel/tire combinations created from plastic or composite matrix materials are entering use but may be difficult to fabricate in a manner to be interchangeable with existing pneumatic tire and wheel systems on vehicles.

Pneumatic tires allow mounting to a range of conventional wheel for use on various vehicles using well established tools and mounting machines. Additionally, such capability allows easy replacement of tires that do become damaged or reach end of life wear. Non-pneumatic tire systems are not currently mountable to convention vehicle wheels.

It is therefore desirable to provide non-pneumatic tire/wheel combinations which exhibit the desired survivability capabilities. It is also desirable to provide non-pneumatic tire/wheel combinations that are mountable to existing convention wheels for pneumatic tire/wheel systems.

SUMMARY

Embodiments disclosed herein provide a non-pneumatic tire and wheel assembly incorporating a tire tread and a conventional vehicle wheel with a molded elastomer tire body element received in the tread and having integral wall elements extending radially inward from the tire body element for sealing engagement with the wheel. The tire body element includes multiple concentric layers with alternating spokes.

In certain embodiments the molded elastomer tire body element has an outer surface recessed from the tire tread and further incorporates a bonded multilayer cover received within the recess. An attachment plate is bonded to the cover and attached to the wheel.

Fabrication of an enhanced survivability tire assembly of the embodiments disclosed is accomplished by forming inner and outer mold elements with strut and aperture dimensions adapted for the desired spoke design and mating rubber cast blocks. A center plug is formed and releasably carried chamber forms are attached thereto. A tread is then prepared for casting and the tread, outer mold element, center plug with chamber forms, inner mold element and rubber casting blocks are assembled. An elastomer is then introduced into the mold assembly through fill tubes inserted in fill apertures in the center plug and chamber forms to cast concentric layers with spokes around the rubber cast blocks and integral side walls around the chamber forms. The elastomer is then allowed to dry. The rubber blocks and mold elements are then disassembled from the tire assembly which is cured at high temperature. The tire assembly is then mounted on a conventional wheel with conventional mounting tools to deform the integral side walls. A pneumatic chamber formed by the side walls is then inflated.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

FIG. 1 is a side view of an embodiment of the non-pneumatic tire and wheel assembly with cover;

FIG. 2 is a front section view of the embodiment of FIG. 1;

DETAILED DESCRIPTION

Figure 3:
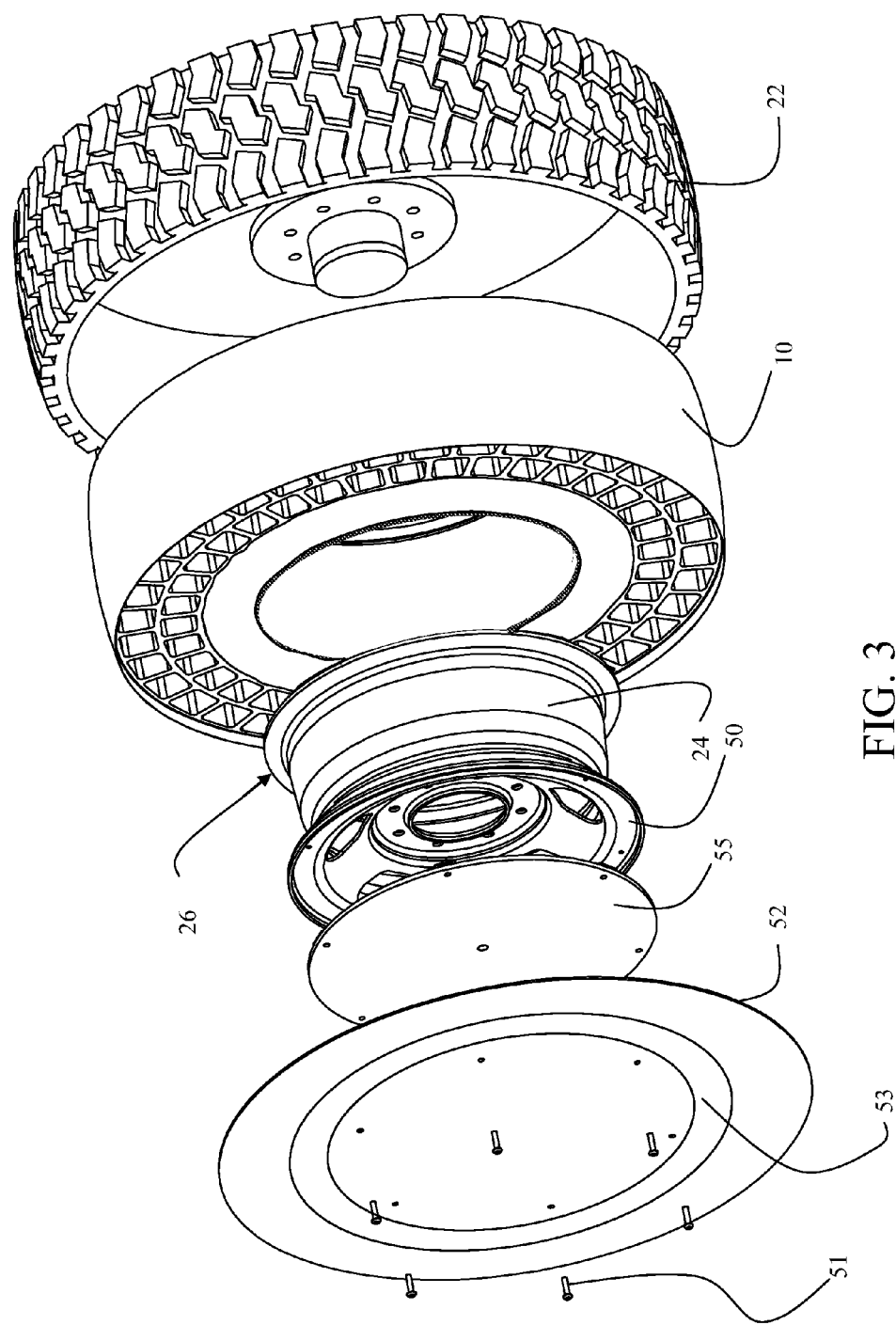
FIG. 3 is an isometric exploded view of the elements of the embodiment of FIG. 1.

The embodiments described herein with respect to tactical vehicle use provide a non-pneumatic tire element with hollow spokes that do not block blast pressure, instead allowing the pressure wave to pass-through the tire venting the pressure and reducing likelihood of the tire being blown off the wheel during a blast event. The exemplary urethane cast tire is resistant to small arms fire and is not compromised from minor small arms bullet impacts. The urethane spokes are durable and of sufficient number and strength to provide redundant functionality even after punctures from bullets, nails or other small projectiles. Concentric spoke layers allow a greater number of load paths and flexibility. These redundant load paths provide greater tolerance to IED blast protection and small arms fire. "Run flat or damaged" capability is inherent by eliminating the need for the tire to contain pressurized air.

The embodiments additionally include a pneumatic interface between the tire element and wheel created by integrally molded sidewalls extending over an inner portion of the tire radial extent which engage standard mounting beads on conventional wheel rims and are inflatable to engage the wheel in a conventional manner. This allows the complete structure of the embodiment to be mounted to any Original Equipment Manufacturer (OEM) wheel using standard tire mounting equipment. Additionally, this pneumatic interface allows the driver in an appropriately equipped tactical vehicle to adjust air pressure and ride smoothness/traction while in motion using the existing Central Tire Inflation (CTI) system as in a conventional pneumatic tire/wheel system.

The embodiments further may incorporate a cover that mounts inset to the wheel tread providing high durability since the cover does not protrude beyond the outer profile of the tire tread reducing exposure to potentially damaging debris such as rocks and sticks during operations. Convex shape of the cover and durable material returns to original form after buckling during compression of the tire/wheel in operation. The cover keeps the tire spokes from filling with mud and dirt thereby maintaining wheel balance and ride smoothness. The combination of the elements in the embodiments reduces heat emissions associated with pneumatic tires by eliminating the rubber sidewalls found on pneumatic tires and masking the tire/wheel with the wheel cover. Armor may be included in the cover for the pneumatic interface portion of the embodiment. The limited radial extent of the pneumatic interface reduces the size and weight of such armor significantly over any conventional pneumatic tire armor.

The fabrication process for the disclosed embodiments allows for ease of manufacture of the wheel/tire combination and design parameters such as spoke thickness/reinforcing fibers can easily be varied to match vehicle load requirements and ride flexibility. Further, the tire/wheel as fabricated may then be mounted on OEM rims and therefore can be built for any wheeled vehicle, including tactical vehicles such as HMMWV or Stryker providing design and manufacturing cost savings.

Referring to FIGS. 1, 2 and 3, the embodiment shown provides a non-pneumatic tire and wheel assembly 8 which incorporates a molded elastomer tire body element 10 having concentric layers 12 and 14 with alternating spokes 16 of elastomer web. For the exemplary embodiments disclosed herein, urethane is employed as the elastomer. However depending on specific application requirements for the vehicle tire similar materials with durometers ranging from approximately 40 to 90 on the Shore A scale may be employed. The tire body element 10 is engaged at an outer circumference 21 by a tread 22 of vulcanized rubber or similar material having a traction lug and groove pattern comparable to conventional pneumatic tires. The tread may be similar in design and construction to a tread blank employed in retreading of conventional pneumatic tires. Integral wall elements 17, 18 extend radially inward from the tire body element 10 and include outer and inner engagement beads 19, 20 on an inner circumference to engage a conventional tire rim 24 of a conventional vehicle wheel 26 which may be constructed in conventional fashion with forged, pressed or cast steel or aluminum structure. For the embodiment shown in the drawings, two concentric layers of spokes are shown for the non-pneumatic tire body elements with a radial length comparable to one layer for the integral wall elements. The number of concentric layers and the relative radial length of the integral wall elements may vary for alternative embodiments wherein a sufficient resilient bight length is maintained in the integral wall elements for mounting over a conventional wheel rim.

An outer circumferential engagement dome 32 is present on the outer circumference of the tire body element 10 which engages a mating depression 33 in the inner wall 34 of the tread to enhance engagement of the tire body element to the tread to prevent separation during operation. In alternative embodiments additional adherence features may be employed in tread for additional engagement of the molded tire body element or the tread may be integrally molded with the tire body element.

As best seen in FIG. 2, the wheel incorporates a web 36 extending from rim 24 for standard engagement of a vehicle axle hub 38. The web may include ventilating perforations 40 for brake cooling or wheel weight reduction and includes standard lug bores 42 for attachment of the wheel to the hub. Inner bead ring 44 and outer bead ring 45 terminate the rim profile. Engagement beads 19, 20 on the integral wall elements 17, 18 are received by the bead rings 44 and 45 in a manner comparable to a conventional tire allowing pneumatic inflation of chamber 46 created by the integral wall elements, an inner circumferential surface 47 of the tire body element 10 and the wheel rim 24 effectively forming a pneumatic bladder. In alternative embodiments an inner tube 48 (shown in phantom in FIG. 2) may be employed for enhanced pneumatic sealing of the bladder.

A relief 49 associated with the outer bead ring receives a mounting ring 50. A cover 52 is received on an outer surface 54 of the tire body element and attached to mounting ring 50 with fasteners 51. The outer surface is inset from the tread side wall 56 placing the cover in a protected relief in the tread and tire body element 10 to reduce exposure to potentially damaging debris such as rocks and sticks during operations. The cover reduces mud and dirt introduction into the tire body element spokes 16 from the exterior of the mounted wheel thereby maintaining wheel balance and ride smoothness.

Cover 52 is convex with respect to outer surface 54 thereby providing resiliency to return to original form after buckling during compression of the tire/wheel in operation. The cover is a multilayered concentric composite structure. Attachment plate 55 is bonded to cover 52 for attachment to the wheel. In alternative embodiments, a ring of armor 53 may be embedded in the cover for protection of the pneumatic portion created by the integral wall elements extending from the tire body element. For the embodiment shown, fasteners 51 are quick release ball lock alignment pins extending through the attachment plate and into the wheel rim.

For exemplary embodiments, the elastomeric material employed for the tire body element is urethane such as PR1664D two-part, castable 100% solids, polyurethane elastomer produced by PRC-DeSoto International, Inc., CDP Division, 2817 Empire Avenue, Burbank, Calif. 91504. Materials for alternative embodiments may include Two Component Polyurethane Cast Elastomer Systems such as Tadco S Series with Shore Hardness from A70 to A99 produced by T. A. Davies Company, 19500 S Alameda St., East Rancho Dominguez Calif. (having Polyether (PTMEG) Polyol Mixture and Polyether or Polyester/MDI Quasi-Prepolymer Isocyanate) and industrial tire rubber compounds such as natural rubber, styrene butadiene rubber, and polybutadiene rubber.

The resiliency of the tire body element 10 is determined based on the urethane composition and spoke design. Thickness of the web for the spokes in the exemplary embodiments ranges from approximately 1/16" to 1/2" depending on specific application and may be varied in the adjacent concentric layers of alternative embodiments for tailoring overall wheel/tire body element flexure during operation. For the exemplary embodiment shown in the drawings, the radial spokes in the concentric layers are 0.375" and the concentric rings between the spokes are 0.3125". In the embodiment shown, the spokes 16 alternate for symmetrical adjacent support of spokes in adjacent layers. Additionally, a simple rectangular or trapezoidal design is shown for the cross section of the spokes. In alternative embodiments a profiled cross section may be employed for performance enhancement. Hardness (or flexibility) of tire body element may be of constant durometer throughout the concentric layers, or may vary by up to 50% to optimize performance for flexibility. The elastomer mix can be varied in real time as the pour proceeds with material of differing durometers injected in to the different spoke layers. For the exemplary embodiments, the integral wall elements 17, 18 are approximately 2 inches in height or about 1/4 of the overall radial extent of the total tire body element 10 extending from the wheel rim. The wall thickness in the exemplary embodiment varies from approximately 0.25" at the innermost edge (the tire bead) to approximately 0.125" for most of the 2" wall height, and back to 0.25" at the outermost corner of the wall where it transitions to the spokes. Wall height and flexibility are determined to accommodate necessary resiliency for expansion over the wheel rim during mounting or removal while limiting the overall height of the wall to minimize the depth of the pneumatic portion of the tire element and thereby the area presented for potential damage by projectiles or blast and to enhance the run flat/damaged capability of the non-pneumatic tire system as a whole.

The spoke design provides a net open area of 61% to 78% of the total surface of the tire body element depending on the number of concentric layers retained and the radial extent of the required bladder wall thereby reducing the likelihood of penetration of the tire body element by projectiles such as small arms fire and maximizing the blow through open area for blast survivability. The alternating symmetrical adjacent support allows fracture or destruction of a number of spokes in the wheel without a disabling performance reduction in the wheel/tire body element system.

The combination of the tire body element 10 and cover 52 in the embodiments shown reduces heat emissions associated with pneumatic tires by eliminating the rubber sidewalls found on pneumatic tires and by masking the tire body element 10 and wheel 26 with the wheel cover.

Figure 4:
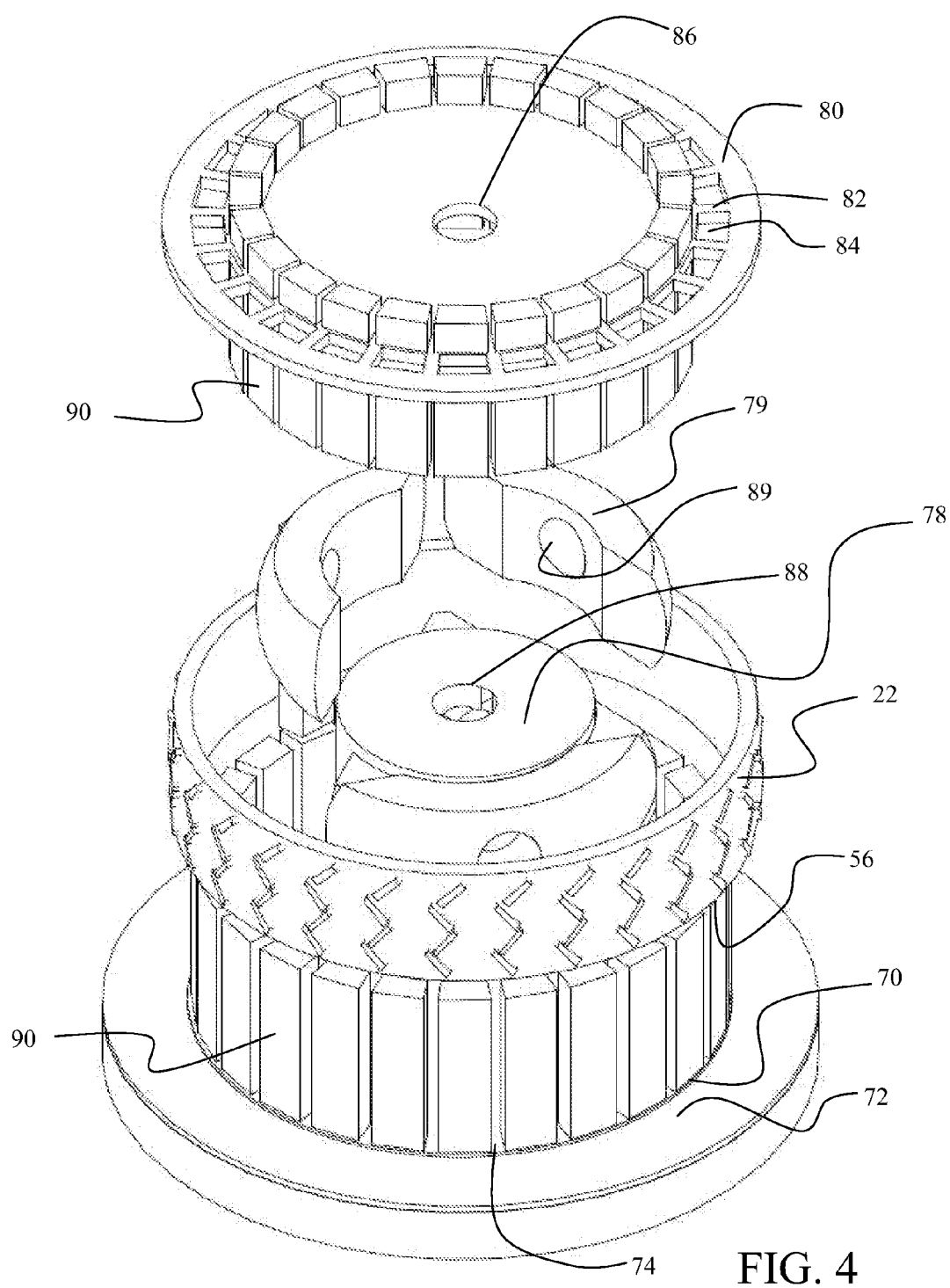
FIG. 4 is an exploded view of the tooling for fabrication of the embodiments described; and, FIG. 5 is a flow chart depicting the fabrication and mounting of the embodiment of FIG. 1.

Fabrication of the non-pneumatic tire assembly of the exemplary embodiments is accomplished by casting with a pour molding process. As shown in FIG. 4, an outer mold element 70 is received within the tread 22. In various embodiments, outer mold element 70 may extend from a flat plate 72 with the thickness of the outer mold element corresponding to the recess depth of the tire body element outer surface 54 from the tread side wall 56 or have an outer rim for engagement of the tread side wall 56 for accurate depth placement within the tread to create the recess of the tire body element outer surface 54. The outer mold element incorporates struts 74 corresponding to the spoke locations in the tire body element with apertures 76 to receive rubber mold blocks as will be described in greater detail subsequently. A center plug 78 is centered on the outer mold element. Pneumatic chamber forms 79 are releasably carried by the center plug to form the pneumatic chamber within the integral walls of the tire assembly.

An inner mold element 80 is concentrically received over tread 22. The inner mold element incorporates struts 82 and apertures 84 symmetrical with the outer mold element. Molding material fill tube 86 interfaces with apertures 88 and 89 in the center plug and pneumatic chamber forms. For the embodiment shown, three mating apertures through the pneumatic chamber forms from a central fill tube are employed.

Rubber casting blocks 90 are inserted through apertures 84 in the inner mold element 80 to be received in the corresponding apertures in the outer mold element 70 to complete the casting mold. Sizing of the struts and apertures in the outer and inner mold elements and the rubber casting blocks provides corresponding sizing of the spokes in the tire body element as cast. The chamber forms determine the configuration and sizing of the pneumatic chamber and the associated integral walls of the tire assembly. For casting, the elastomeric is introduced through the fill tubes to completely fill the interstitial spaces between the rubber mold blocks.

The cast non-pneumatic tire assembly is then allowed to dry at room temperature. The rubber mold blocks and outer and inner mold elements are then removed. The chamber forms are released form the center plug and the plug is removed. The chamber forms may then be collapsed out of the chamber for removal. The cast non-pneumatic tire and wheel assembly is then cured at high temperature For the exemplary PR1664D Urethane material, high temperature cure may be accomplished in 3 hours at 212° F. or 12 hours at 180° F. or 16 hours at 160° F.

While disclosed for the embodiments herein as a pour casting process, in alternative fabrication methods injection molding of the tire body element in standard split molds may be accomplished with bonding of the tread to the tire body element after cure. In other alternative embodiments, the tread may be cast in conjunction with the tire body element using tooling for pressure injection molding.

Figure 5:
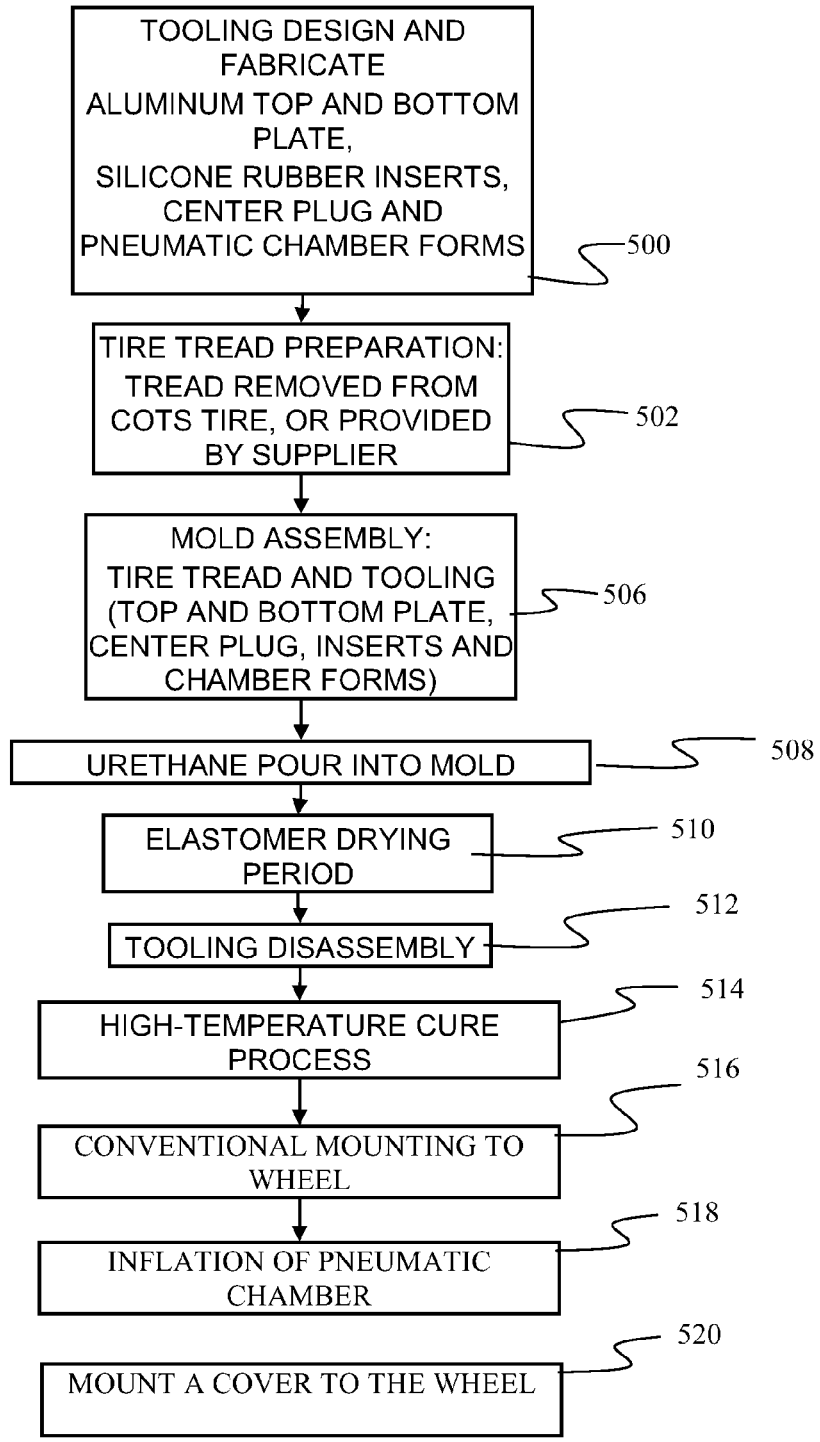

FIG. 5 demonstrates the manufacturing process for the cast non-pneumatic tire with pneumatic bladder and wheel assembly as described. In step 500 the inner and outer mold elements are machined or cast from aluminum or other appropriate tooling material with strut and aperture dimensions adapted for the desired spoke design and integral wall height established to achieve required structural properties for service use. Mating rubber cast blocks are prepared for insertion into the apertures in the inner and outer mold elements. The tread is then prepared for casting, step 502. Tread from a conventional off the shelf (COTS) tire tread such as that employed for convention tire retreading may be employed. The tread, outer mold element, center plug with chamber forms, inner mold element and rubber casting blocks are then assembled for molding, step 506. The outer mold element is received within the tire tread to create a recess for protective mounting of a cover as described subsequently. Mounting of the outer mold element on a tooling plate allows the tire tread to be supported by the tooling plate with the outer mold inserted. The elastomer, urethane for the exemplary embodiment as previously described, is then introduced into the mold assembly through the fill tubes, step 508. The elastomer is allowed to dry, step 510, and the tooling is then disassembled from the non-pneumatic tire assembly 512. A high temperature cure is then accomplished for the non-pneumatic tire assembly, step 514, providing a completed system. The tire assembly is then mounted on a conventional wheel using convention mounting equipment and tools, step 516, and the pneumatic bladder is inflated, step 518. For protection of the non-pneumatic and bladder elements of the tire, a cover may then be mounted to the wheel, step 520.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for fabrication of an enhanced survivability tire assembly and a wheel assembly comprising:
   forming an inner and an outer mold elements having dimensions strut and aperture dimensions adapted for a desired spoke design and mating rubber casting blocks;
   forming a center plug and releasably carried chamber forms;
   preparing a tread for casting;
   assembling the tread, outer mold element, center plug with chamber forms, inner mold element and rubber casting blocks;
   introducing an elastomer into the mold assembly through fill tubes inserted in fill apertures in the center plug and chamber forms to cast concentric layers with spokes around the rubber casting blocks and integral side walls around the chamber forms;
   allowing the elastomer to dry such that a tire assembly with the tread is formed;
   disassembling the rubber casting blocks and inner and outer mold elements from the tire assembly;
   curing the elastomer at a temperature of at least 160° F.;
   mounting the tire assembly on a metal wheel for a vehicle with mounting tools to deform the integral side walls; and
   inflating a pneumatic chamber formed by the integral side walls.

2. The method of claim 1 wherein the step of forming the inner and outer mold elements further comprises:
   concentrically receiving the inner and outer mold elements with the tread, the outer mold intruding into the tread to create a recess of the tire body element outer surface.

3. The method of claim 2 further comprising mounting the outer mold element on a tooling plate.

4. The method of claim 2 further comprising mounting a cover received within the recess.

5. The method of claim 4 further comprising forming a concave multilayer cover.

6. The method of claim 5 wherein the step of forming a concave multilayer cover further comprises: bonding an attachment plate to the cover and the step of mounting a cover comprises inserting fasteners through the cover and the attachment plate and into a rim of the wheel.

7. The method of claim 6, wherein the step of inserting fasteners comprises inserting quick release ball lock alignment pins extending through the attachment plate and into the rim of the wheel rim.

8. The method of claim 1 further comprising determining a durometer of the elastomer.

9. The method of claim 8 further comprising varying the durometer for concentric layers of the tire assembly.

10. The method of claim 9 wherein the step of introducing an elastomer includes injecting varying material of differing durometers into different concentric layers.

11. The method of claim 1 wherein the wheel incorporates a rim with inner and outer bead rings and further wherein the step of forming a center plug and releasably carried chamber forms includes forming beads for sealing engagement on the bead rings to form a pneumatic chamber.

12. The method of claim 11 wherein the step of mounting the tire assembly further includes engaging the beads and the bead rings for pneumatic sealing of the pneumatic chamber.

13. The method of claim 1 wherein the step of introducing an elastomer includes selecting an elastomer having a durometer ranging from approximately 40 to 90 on the Shore A scale.

14. The method of claim 13 wherein the step of selecting an elastomer comprises selecting an elastomer from the set of urethane, Two Component Polyurethane Cast Elastomer Systems having Polyether (PTMEG) Polyol Mixture and Polyether or Polyester/MDI Quasi-Prepolymer Isocyanate, natural rubber, styrene butadiene rubber, and polybutadiene rubber.

15. The method of claim 1 wherein the step of introducing an elastomer includes forming an engagement dome on an outer circumference of a tire body element engaging a mating depression in the inner wall of the tread.

16. The method of claim 1 further comprising inserting an inner tube into the pneumatic chamber and the step of inflating a pneumatic chamber comprises inflating the inner tube.

17. The method of claim 1 wherein the step of forming a center plug and releasably carried chamber forms further comprises determining wall height and flexibility to accommodate necessary resiliency for expansion over the wheel during mounting or removal.

18. The method of claim 1 wherein the step of forming an inner and an outer mold elements further comprises determining a thickness of a web for the desired spoke design.

* * * * *